United States Patent Office

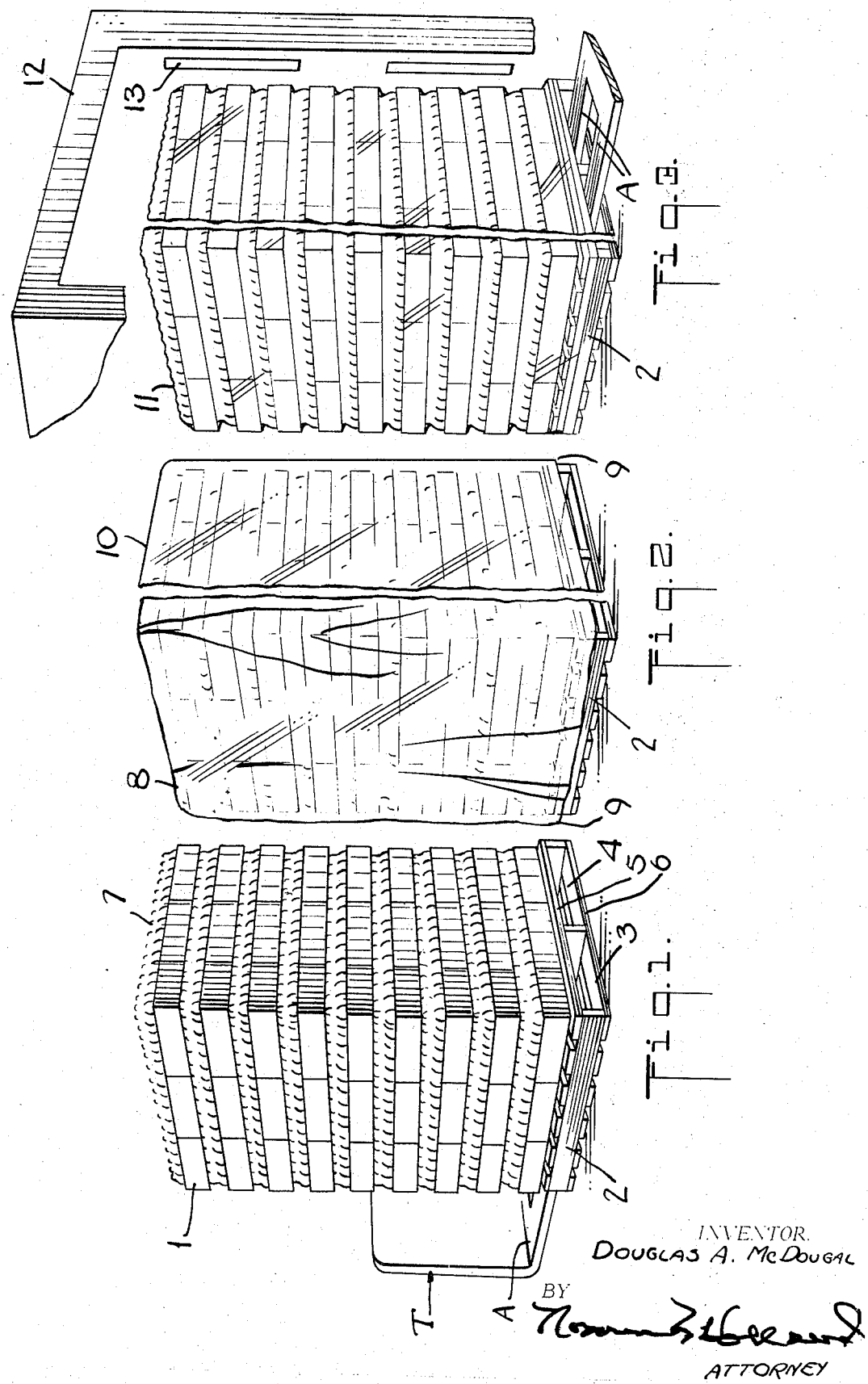

3,529,717
Patented Sept. 22, 1970

3,529,717
PALLETIZED LOAD OF FILM-ENCLOSED ARTICLES
Douglas A. McDougal, Lancaster, Ohio, assignor to Anchor Hocking Corporation, Lancaster, Ohio, a corporation of Delaware
Continuation of application Ser. No. 608,625, Jan. 11, 1967. This application June 12, 1969, Ser. No. 834,234
Int. Cl. B65d 57/00, 71/00; B65g 1/14
U.S. Cl. 206—65                                              2 Claims

ABSTRACT OF THE DISCLOSURE

A palletized package comprising a pallet and stacked load enclosed in heat shrinkable film shrunk tightly about the load and pallet to prevent shifting movement.

---

This application is a continuation of Ser. No. 608,625 filed Jan. 11, 1967, now abandoned.

BRIEF DESCRIPTION OF THE DISCLOSURE

This invention relates to a novel method of packaging or palletizing stacked articles and the packages or palletized loads resulting therefrom. More particularly the invention concerns a method of securing large stacked palletized loads such as cases of bottles by enveloping them with a heat shrinkable film or tube and heating the film to shrink it tightly about the load thereby holding the individual cases against shifting relative to each other and a pallet support.

It has long been a problem in the handling and shipping of large stacked articles, such as palletized cases of bottles and other cartons of comparatively large size, to achieve some means of preventing the individual columns of the articles from separating and shifting with respect to each other. The difficulties which are presented when loads of this type experience relative shifting during movement are apparent. The stability of the load is upset and due to the size of the overall package and the individual elements it becomes a major problem to re-orient and restabilize the load. In the past it has been necessary to apply straps, strings, chains, and other retaining members about the loads to form a compact stable package for handling and shipment. The application of these straps, strings, and chains or other binders is time consuming and awkward and usually requires several separate binders to achieve satisfactory stabilization of the whole load. In addition the dismantling of these binders upon arrival at the unloading destination after shipment requires further time and pallet handling.

The present invention solves these various problems by presenting a method of packaging such cumbersome loads with a heat shrinkable material requiring a minimum of effort and handling and resulting in a compact uniformly held package which can be readily shipped and dismantled. In addition, this package keeps the contained cartons and articles substantially free from dust, moisture, or other contamination during shipment which is important particularly when shipping empty containers which are to be filled with foodstuffs.

The use of heat shrinkable material for packaging has been well known in the past in connection with the wrapping of small consumer products such as foods and other articles which may be adversely affected by prolonged exposure to air and where transparent films of this type are particularly suitable for attractive display of these products. However, heretofore the use of such film has been limited to applications with smaller items and there has been a lack of awareness of its structural capabilities in connection with much larger packages. The present invention utilizes this capability of heat shrinkable plastic film in creating a large compact stabilized shipping package which is easily formed prior to shipment and easily removed after shipment.

An object of the present invention therefore is to provide an improved method for packaging large stacked palletized loads.

Another object of the present invention is to provide an improved method of packaging a large palletized load of stacked cases of bottles and the like.

Another object of the present invention is to provide an inexpensive and easy method of stabilizing stacked loads of articles.

Another object of the present invention is to provide an improved package of stacked elements which is stabilized and contamination free.

Another object of the present invention is to provide an improved shipping package for stacks of large uniform sized cartons or similar elements.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a view of a palletized load of cartons;

FIG. 2 is a view of a palletized load of cartons as in FIG. 1 with a film envelope fitted loosely over it or a tubular member surrounding it; and FIG. 3 is a view of a palletized load of cartons as in FIG. 2 in a heating tunnel with the film envelope or tubular member shrunk to the contour of the load after heating.

DETAILED DESCRIPTION

A preferred embodiment of the present invention will be described, by way of example, in connection with a number of stacks of cartons holding bottles ready for shipment to a bottler for the bottling of liquid or solid food stuffs. It is clear that other generally similar palletized loads may be similarly handled. The cartons 1 are shown in FIG. 1 mounted on a wooden pallet 2 of the type that is used in connection with fork lifts. The forked arms A of the fork lift truck T or other lifting elevator are inserted in the openings 3 and 4 between the upper and lower platforms 5 and 6 of the pallet 2 and the entire load is raised and carried by the fork lift truck from one point to another during handling preparatory to shipment. Likewise upon arrival at the particular destination the entire load is picked up by another fork lift and brought to a point where the cartons 1 are individually unloaded and the bottles 7 are filled. During this handling it is readily apparent that if the cartons are not properly stacked upon each other in well balanced and stabilized columns there is a great danger that shifting and colliding of the cartons within and between the individual columns may occur. It is thus necessary to tie up the load to prevent any shifting between the cases in an individual column and between the columns themselves. In the past this has generally been done by tying a network of straps or chains around and over the load in an attempt to form a structural unit with no internal relative movement. This and like methods have proved quite difficult and often ineffective for this purpose.

The first step of the method of the present invention is shown in FIG. 2 wherein an envelope 8 of thin flexible heat shrinkable film is placed over the entire load. The envelope 8 is shown in the form of a large loosely fitting sack having an open end 9. An alternative form of the preferred embodiment is also shown wherein a tube 10 rather than a film of shrinkable material is used. However, any arrangement may be used which will achieve the desired surrounding configuration as will be more fully understood upon the following further explanation.

The open end 9 of the film envelope 8 or the tube 10 is shown extending around the top of the pallet 2 but again satisfactory results will be achieved if the open end reaches the level of the bottom of the lowest articles in the stacks.

With the envelope 8 or tube 10 in this position heat is applied to the film causing it to shrink. The shrinkage is achieved substantially uniformly. The resulting package is shown in FIG. 3. The film shrinks and tightly surrounds the outer contours of the cartons. A solid, contamination-impervious, outer casing 11 is thereby formed about the entire load with the lower edge of the envelope gripping the top of the pallet 2. The top of the envelope whether open or closed will likewise grip the top of the peripheral cartons at least. The stacked cartons 1 within the casing 11 are thus uniformly held against the shifting of the columns with respect to each other and against shifting within the columns.

The envelope may be pre-formed as a sack, tube, or sleeve and then placed over the load or it may be formed partially or completely around the load at the point of use.

Heating of the envelope may be accomplished by the use of simple hand-held heating devices. However, where the method is to be used on a production line basis, a tunnel or chamber 12 may be constructed (FIG. 3) into which the wrapped load is inserted. The chamber 12 may contain hot air fans or ducting 13, or infrared heating lamps or the like. Means for placing the envelope about the load may also be incorporated in this chamber 12.

A particular material which has been found suitable for use in the present invention is polyethylene in a film or tubular form and having biaxial shrink characteristics. A single sheet of approximately 1½ mils thickness has been found to be adequate in connection with the above-described application but a number of layers may be used where larger loads are being accommodated. At appropriate temperatures suitable shrinkage may be achieved in 10 to 20 seconds and the entire palletizing operation may be performed in about one minute.

A compact stabilized package is thus created which is readily shipped and handled with a minimum of difficulty due to the instability or shifting of the load. Upon arrival at its destination the film is easily severed with an appropriate tool and the stacked cartons are readily available for dismantling.

Having thus described my invention, I claim:

1. An improved palletized means for storing and transporting bottle cartons comprising a generally rectangular rigid pallet, a plurality of bottles loosely contained in each of a plurality of open cartons with the bottle tops exposed above the tops of the cartons and with the cartons stacked on said pallet in a plurality of vertical stacks lengthwise of the pallet and a plurality of vertical stacks crosswise of the pallet and in a relatively large number of horizontal layers whose height exceeds the pallet length and exceeds the pallet width and with the bottoms of one layer of cartons resting on the tops of the bottles in the cartons of the next lower layer, and a relatively thin flexible sheet of heat shrinkable plastic material formed into a single envelope open at least at one end and surrounding the stack of cartons, said envelope being heat shrunk substantially uniformly and tightly around said stack of cartons, said envelope conforming at least partially to the outer contours of said stack of cartons and including inwardly extending grooves between layers of cartons adjacent the exposed portions of the bottles and gripping the outer edges of said pallet said stack being held against the shifting of cartons on each other and on said pallet.

2. The means as claimed in claim 1 wherein the plastic material is polyethylene.

References Cited
UNITED STATES PATENTS

| 2,885,097 | 5/1959 | Lyon. |
| 3,050,402 | 8/1962 | Dreyfus et al. |
| 3,347,365 | 10/1967 | Funkhouser. |
| 3,410,396 | 11/1968 | Copping. |

WILLIAM T. DIXSON, Jr., Primary Examiner

U.S. Cl. X.R.

53—26; 206—60; 214—10.5